(12) United States Patent
Hirata et al.

(10) Patent No.: US 6,918,054 B2
(45) Date of Patent: Jul. 12, 2005

(54) STORAGE APPARATUS AND CONTROL METHOD THEREOF

(75) Inventors: Keiichiro Hirata, Odawara (JP); Akira Kojima, Odawara (JP)

(73) Assignees: Hitachi, Ltd., Tokyo (JP); Hitachi Software Engineering Co., Ltd., Yokohama (JP)

(*) Notice: Subject to any disclaimer, the term of this patent is extended or adjusted under 35 U.S.C. 154(b) by 0 days.

(21) Appl. No.: 10/422,941

(22) Filed: Apr. 25, 2003

(65) Prior Publication Data

US 2003/0196147 A1 Oct. 16, 2003

Related U.S. Application Data

(63) Continuation of application No. 09/437,262, filed on Nov. 10, 1999, now Pat. No. 6,625,755.

(30) Foreign Application Priority Data

Nov. 12, 1998 (JP) .......................................... 10-322068

(51) Int. Cl.[7] ............................................. G06F 11/00
(52) U.S. Cl. ...................................................... 714/17
(58) Field of Search .............................. 714/16, 17, 55, 714/56; 711/167, 168, 169

(56) References Cited

U.S. PATENT DOCUMENTS

| 4,845,614 | A | | 7/1989 | Hanawa et al. |
|---|---|---|---|---|
| 5,388,254 | A | | 2/1995 | Betz et al. |
| 5,548,783 | A | * | 8/1996 | Jones et al. ................... 710/16 |
| 5,768,494 | A | | 6/1998 | Takeishi |
| 6,012,090 | A | * | 1/2000 | Chung et al. ............... 709/219 |
| 6,625,755 | B1 | * | 9/2003 | Hirata et al. .................. 714/17 |

FOREIGN PATENT DOCUMENTS

| JP | 8-95717 | 4/1996 |
|---|---|---|
| JP | 11-119923 | 4/1999 |

* cited by examiner

*Primary Examiner*—Scott Baderman
(74) *Attorney, Agent, or Firm*—Mattingly, Stanger, Malur & Brundidge, P.C.

(57) ABSTRACT

Retrying processing in access of data having different properties required such as reliability and real time property of the access is optimized. In a magnetic disk apparatus connected to a host computer 10 through a connection interface and including a magnetic disk controller and a magnetic disk, the magnetic disk controller includes a retrying table in which an area address, an area size, a retrying limit value and the like are set for each of a plurality of storage areas A, B and the like of the magnetic disk and the retrying limit value set in the retrying table from the host computer is used to optimize the retrying processing for data having different reliability or real time property of access such as management data and image/audio data stored in each of the storage areas A, B and the like individually.

5 Claims, 7 Drawing Sheets

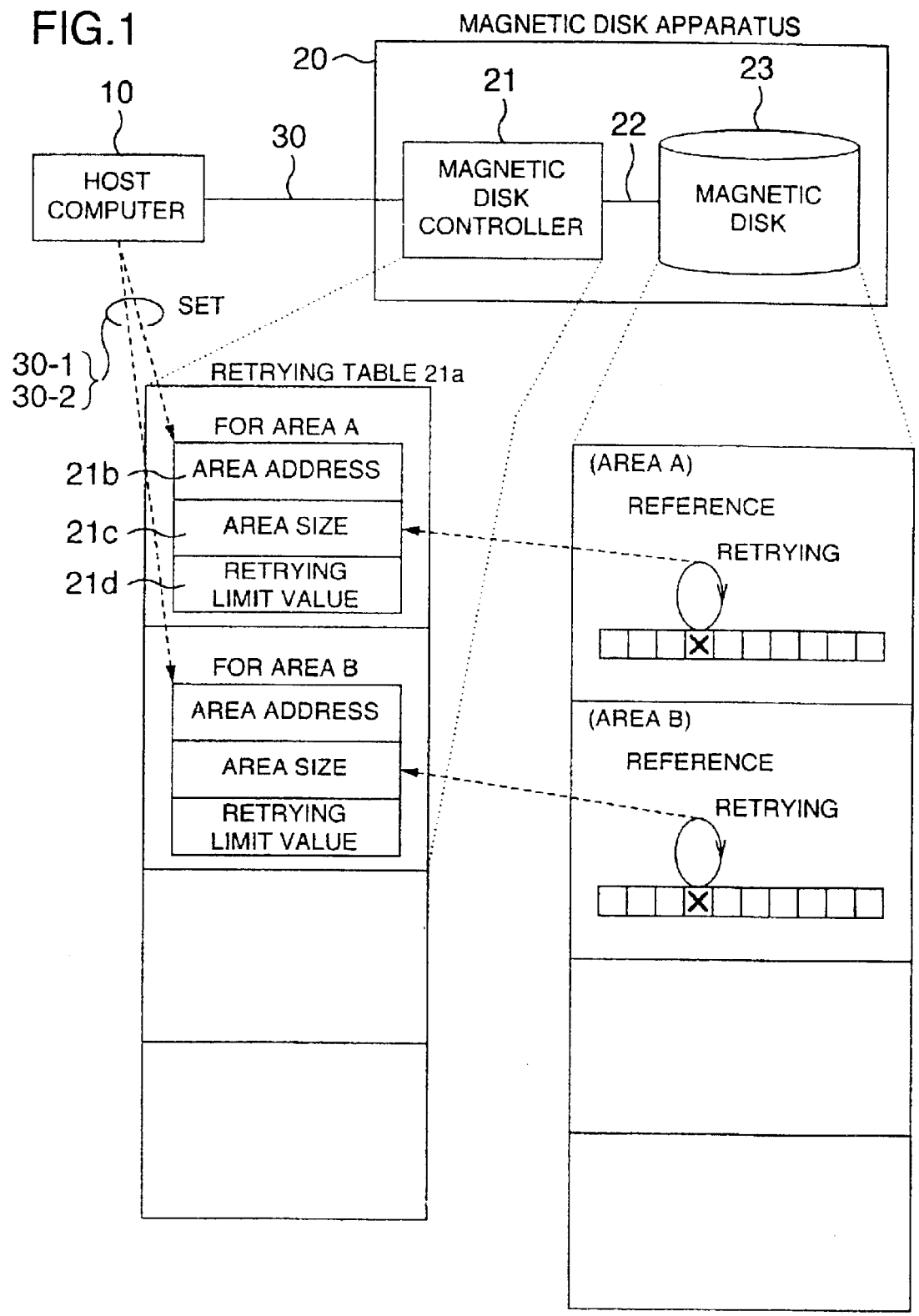

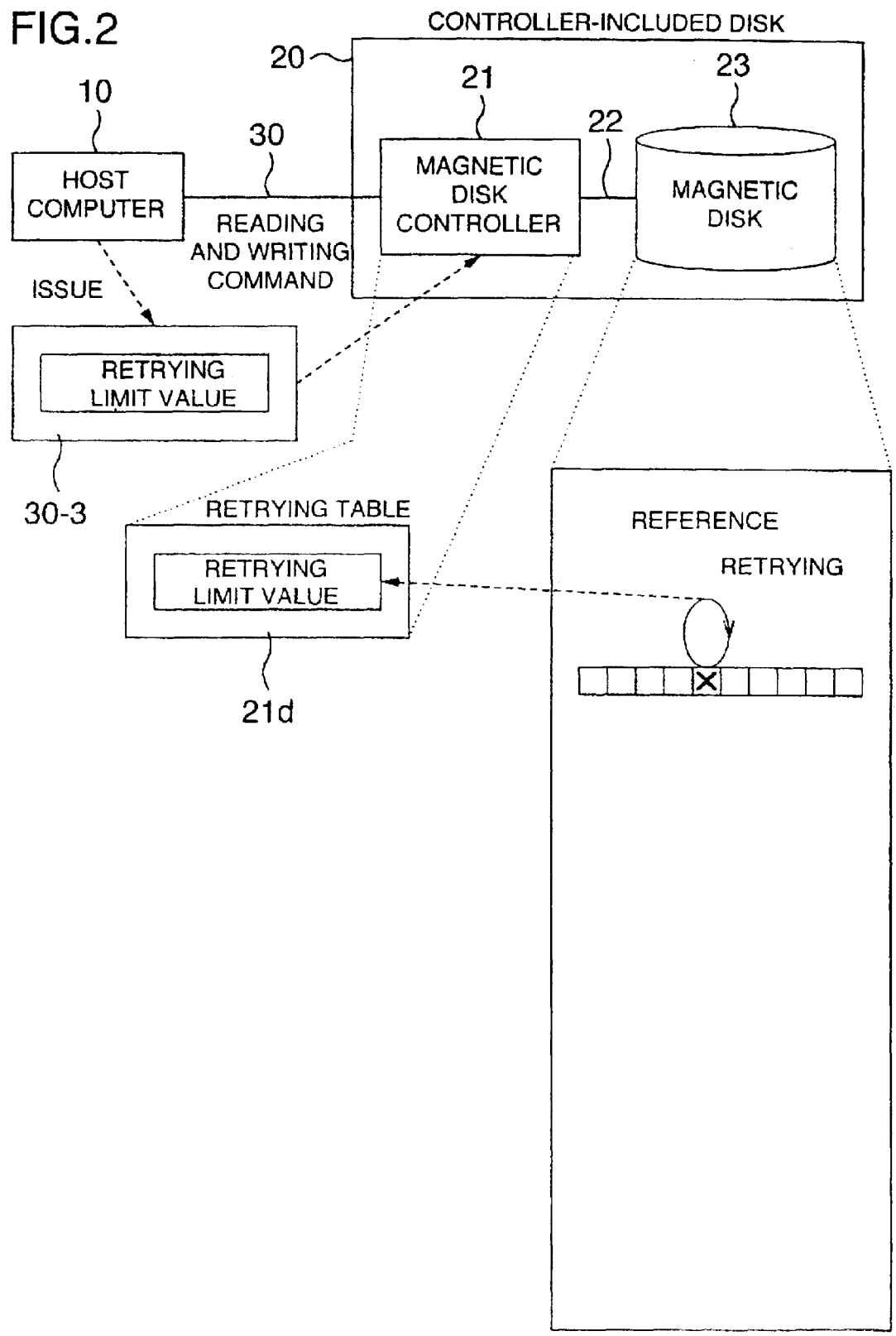

FIG.3

1. METHOD OF DESIGNATING NUMBER OF TIMES OF RETRYING OPERATORS AND EXECUTION TIME OF COMMAND BY DIVISION OF AREA (DESIGNATION OF RETRYING LIMIT VALUE AND AREA BY VENDER UNIQUE MODE PARAMETER)

COMMAND DESCRIPTOR BLOCK (30-1)

| BIT / BYTE | 7 | 6 | 5 | 4 | 3 | 2 | 1 | 0 |
|---|---|---|---|---|---|---|---|---|
| 0 | OPERATION CODE (0x15) | | | | | | | |
| 1 | LOGICAL UNIT NUMBER | | | PF | RESERVED | | | SP |
| 2 | RESERVED | | | | | | | |
| 3 | RESERVED | | | | | | | |
| 4 | PARAMETER LIST LENGTH (n+2) | | | | | | | |
| 5 | CONTROL BYTE | | | | | | | |

- 30-1a: operation code area
- 30-1b: parameter list length area

PF : PAGE FORMAT
SP : SAVE PARAMENTER (TO BE SAVED ON NONVOLATILE AREA)

VENDER UNIQUE MODE PARAMETER (30-2)

| BIT / BYTE | 7 | 6 | 5 | 4 | 3 | 2 | 1 | 0 |
|---|---|---|---|---|---|---|---|---|
| 0 | RESERVED | | PAGE CODE (VENDER UNIQUE) | | | | | |
| 1 | PAGE LENGTH (n) | | | | | | | |
| 2 | START LOGICAL BLOCK ADDRESS 1 | | | | | | | |
| 3 | | | | | | | | |
| 4 | | | | | | | | |
| 5 | | | | | | | | |
| 6 | LENGTH | | | | | | | |
| 7 | | | | | | | | |
| 8 | READ RETRY COUNT OR READ TIME LIMIT | | | | | | | |
| 9 | WRITE RETRY COUNT OR WRITE TIME LIMIT | | | | | | | |
| 10 | VERIFY RETRY COUNT OR VERIFY TIME LIMIT | | | | | | | |
| 11 | RESERVED | | | | | | | |
| ... | ... | | | | | | | |
| n-9 | START LOGICAL BLOCK ADDRESS m | | | | | | | |
| n-8 | | | | | | | | |
| n-7 | | | | | | | | |
| n-6 | | | | | | | | |
| n-5 | LENGTH | | | | | | | |
| n-4 | | | | | | | | |
| n-3 | READ RETRY COUNT OR READ TIME LIMIT | | | | | | | |
| n-2 | WRITE RETRY COUNT OR WRITE TIME LIMIT | | | | | | | |
| n-1 | VERIFY RETRY COUNT OR VERIFY TIME LIMIT | | | | | | | |
| n | RESERVED | | | | | | | |

- 30-2a: PAGE CODE
- 30-2b: PAGE LENGTH
- 30-2c: START LOGICAL BLOCK ADDRESS 1
- 30-2d: RETRY COUNT / TIME LIMIT fields TIME LIMIT : ex.SET VALUE * 100ms

FIG.4

2. DESIGNATION OF READING AND WRITING COMMAND

COMMAND DESCRIPTOR BLOCK 30-3

| BIT<br>BYTE | 7 | 6 | 5 | 4 | 3 | 2 | 1 | 0 | MEANING |
|---|---|---|---|---|---|---|---|---|---|
| 0 | | | | OPERATION CODE (0x28, 0x2A, 0x2F,) | | | | | (READ EXTENDED, WRITE EXTENDED, VERIFY) |
| 1 | LOGICAL UNIT NUMBER | | | | | | CONTROL | | |
| 2 | LOGICAL BLOCK ADDRESS | | | | | | | | |
| 3 | | | | | | | | | |
| 4 | | | | | | | | | |
| 5 | | | | | | | | | |
| 6 | RETRY COUNT OR COMMAND TIME LIMIT | | | | | | | | (RESERVED FIELD OF ANSI SPEC) COMMAND TIME LIMIT : ex.SET VALUE * 100ms |
| 7 | LENGTH | | | | | | | | |
| 8 | | | | | | | | | |
| 9 | CONTROL BYTE | | | | | | | | |

30-4

STORAGE APPARATUS AND CONTROL METHOD THEREOF

This is a continuation application of U.S. Ser. No. 09/437,262, filed Nov. 10, 1999 now U.S. Pat. No. 6,625,755.

BACKGROUND OF THE INVENTION

The present invention relates to a control technique of a storage apparatus and more particularly to such a technique which is effectively applied to retrying control for error or the like in the storage apparatus such as a magnetic disk apparatus.

Recently, a need for storing image and audio data and management data for managing each of the image and audio data in a single magnetic disk apparatus is increased due to the high-speed operation and the large capacity of the magnetic disk apparatus and the development of the multimedia technique. The magnetic disk apparatus of this kind generally adopts an interface of a SCSI (Small Computer System Interface) standard or the like to be connected to a host.

In the magnetic disk apparatus, when an access error to a storage medium occurs while reading and writing requests from the host are being performed, a retrying operation for recovery of the error is performed.

In the above SCSI standard, it is stipulated that the number of times of retrying operations can be specified for each of a reading error and a writing error. However, the stipulation is effective for the whole of the single magnetic disk apparatus and there is a technical problem that the number of times of the retrying operations cannot be specified for an area unit or data unit.

More particularly, in reading or writing of the image data or the audio data, there is a technical problem that image or audio is interrupted when the reading or writing operation is not completed within a time prescribed by the host computer, so that the reproduction quality of the audio or the image is deteriorated. Accordingly, it is general that a reading or writing command is completed within the prescribed time by reducing the number of times of retrying operations at the slight sacrifice of reliability, although reading or writing operation of the management data must be retried as much as possible so that the reliability thereof is not deteriorated.

To this end, in the conventional interface, when the image and audio data and the management data are stored in a single magnetic disk apparatus, it is necessary to issue a command for setting the number of times of retrying operations each time the area for storing each data is accessed. This becomes an overhead in case where the image and audio data and the management data are accessed alternately, so that a technical problem causing deterioration of performance arises.

Referring now to FIG. 7, such a technical problem in the prior art is described. FIG. 7 schematically illustrates the retrying processing in a magnetic disk apparatus of a conventional reference technique.

In FIG. 7, numeral 310 denotes a host computer, 320 a magnetic disk apparatus, 321 a magnetic disk controller having the magnetic disk combined therewith integrally for controlling the magnetic disk apparatus, 323 a magnetic disk, 322 a connection interface for connecting the magnetic disk controller to the magnetic disk, and 330 a connection interface conforming to the standard such as the SCSI for connecting the host computer to the magnetic disk apparatus.

In the retrying processing of the magnetic disk apparatus 320 of such a reference technique, the host computer 310 issues a command for setting the number of times of retrying operations to the magnetic disk apparatus 320 so as to set the number of times of retrying operations for reading and writing error. The magnetic disk apparatus 320 records the number of times of retrying operations for reading and writing error as a table for the number of times of retrying operations in the magnetic disk controller 321 and controls to perform the retrying operation with reference to the number of times of retrying operations recorded in the table in the retrying processing.

On the other hand, when data having different properties are recorded in the single magnetic disk apparatus 320, it is desirable to perform the recording by the number of times of retrying operations coincident with the property thereof as described above. Such data include image data and audio data which are to be read and written at a high speed and management data requiring sufficient retrying operations.

In the configuration of the reference technique of FIG. 7, however, the host computer 310 can set the number of times of retrying operation for the whole storage area of the single magnetic disk apparatus 320 and the host computer cannot set the number of times of retrying operations for an area unit or data unit.

With respect to the retrying operation in reproduction of information, a technique disclosed in, for example, JP-A-8-95717 is known. That is, when the number of times of retry operations for reproduction of a sector requiring the retrying operation of reproduction exceeds a predetermined value upon reproduction of information, reproduced data is stored in a memory of a disk apparatus and means for reading out the reproduced data upon subsequent access is provided to thereby shorten the reproduction time. However, this art does not quite disclose that the number of times and the time of retrying operations for each of a plurality of area and for each of a plurality of kinds of data in a medium are managed individually.

SUMMARY OF THE INVENTION

It is an object of the present invention to provide a control technique of a storage apparatus capable of realizing the optimization of retrying operation for access operation by setting a retrying condition of the access operation for each of a plurality of storage areas set in a storage medium or for each of a plurality of kinds of data stored in the storage medium variously.

It is another object of the present invention to provide a control technique of a storage apparatus capable of completing a reading or writing command within a prescribed time required in data such as image data or audio data of which processing in real time is important and capable of performing retrying operation as much as possible in data such as management data of which reliability is important so that reading and writing can be made without deterioration of reliability.

According to the present invention, in a control method of a storage apparatus including a storage medium in which data transmitted to and received from a higher-rank apparatus are stored, a limit value for at least one of the number of times of retrying operations for access operation and a time required for access operation to a storage area or data is set individually for each of a plurality of storage areas set in the storage medium or for each of a plurality of kinds of data stored in the storage medium.

As described above, as the method of setting the limit value for at least one of the number of times of retrying operations for access operation and the time required for access operation for each of the plurality of storage areas or the plurality of kinds of data individually, the following two methods are considered.

First, parameters for setting the number of division for dividing an area of a storage medium, a size of the divided area and the number of times of retrying operations for an area unit thereof are added to the standard of interface for connecting the higher-rank apparatus and the storage apparatus, and the higher-rank apparatus is adapted to be able to set the parameter to any value. The storage apparatus performs the retrying operation in accordance with the limit value for the number of times of retrying operations or the time required for retrying operation set in the area unit accessed in response to a reading or writing request from the higher-rank apparatus.

Second, an access instruction such as a reading or writing instruction issued by the higher-rank apparatus has a field in which the number of times of retrying operations can be set. The storage apparatus performs the retrying operation in accordance with the limit value for the number of times of retrying operations or the time required for retrying operation designated by the reading or writing instruction when an error occurs in the reading or writing operation. In this case, the limit value for the number of times of retrying operations or the time required for retrying operation can be designated in the data unit to which reading or writing of data is performed without dependence on the storage area in which data is stored.

More particularly, in the magnetic disk apparatus including the magnetic disk controller and the magnetic disk combined integrally and which can be connected to the host computer through an interface such as SCSI, the storage area of the magnetic disk is divided into a plurality of storage areas and retrying information such as the number of times of retrying operations can be registered in each of the storage areas individually. The storage areas can be used properly for each data having different priorities of characteristics such as reliability and real time property required when data having different properties are stored in the single magnetic disk, so that the retrying operation can be controlled in accordance with the property of the data to thereby complete the reading or writing command within the time prescribed by the host computer.

Further, in the above-mentioned magnetic disk apparatus, the host computer can set the retrying information such as the division number of area, the number of times of retrying operations for each area and the prescribed time for reading and writing as the parameter.

In addition, in the magnetic disk apparatus, the retrying information such as the number of times of retrying operations and the prescribed time for reading and writing can be designated for each reading and writing instruction issued by the host computer.

When data having different properties (image and audio data and management data for managing each of the image and audio data) are stored in the single magnetic disk, the retrying operation for reading and writing the image data and audio data and the retrying operation for reading and writing the management data can be distinguished as in the present invention to thereby realize the magnetic disk apparatus suitable for attainment of the completion of the reading and writing command within the time prescribed by the host computer and the high reliability.

In other words, when data having different properties such as the image and audio data and the management data are stored in the single storage apparatus, the limit value for the number of times of retrying operations and the time required for retrying operation can be set for the area unit or the unit of data to be handled to thereby complete the reading and writing command within the time prescribed by the host computer in the case of the data such as the image and audio data of which processing in real time is important and to perform the retrying operation as much as possible in the case of data such as the management data of which the reliability is important so that the reading and writing operation can be performed without deterioration of the reliability.

BRIEF DESCRIPTION OF THE DRAWINGS

FIG. 1 is a schematic diagram illustrating an example of a configuration of an information processing system in which a control method of a storage apparatus according to an embodiment of the present invention is implemented;

FIG. 2 is a schematic diagram illustrating an example of a configuration of an information processing system in which a modification example of a control method of a storage apparatus of the present invention is implemented;

FIG. 3 is a schematic diagram showing an example of a configuration of a command interface used in a control method of a storage apparatus according to an embodiment of the present;

FIG. 4 is a schematic diagram showing an example of a configuration of a command interface used in a modification example of a control method of a storage apparatus according to the present invention;

DESCRIPTION OF THE EMBODIMENTS

Figure 5:
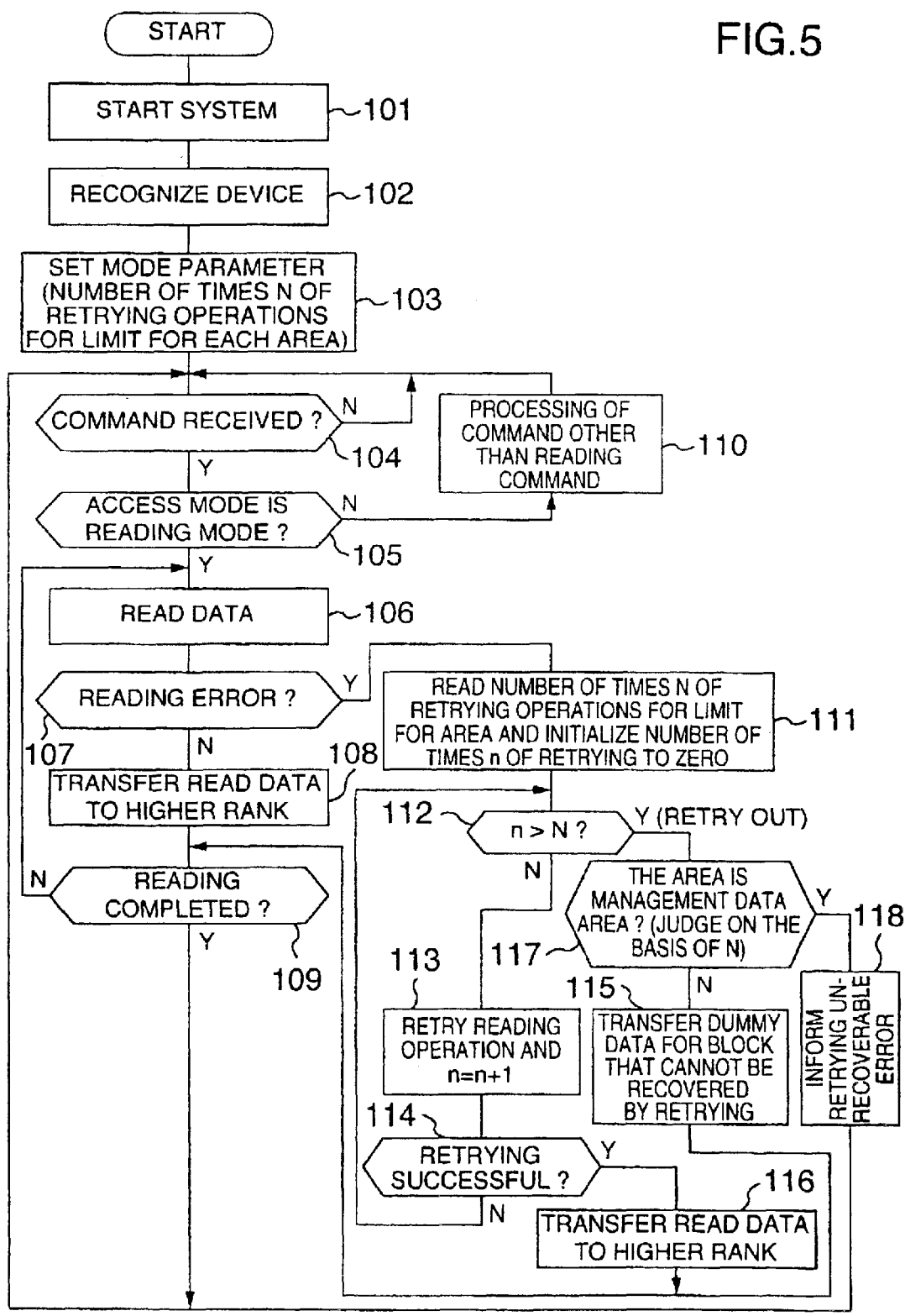
FIG. 5 is a flow chart showing an example of operation of a control method of a storage apparatus according to an embodiment of the present invention.

An embodiment of the present invention is now described in detail with reference to the drawings.

FIG. 1 is a schematic diagram illustrating an example of a configuration of an information processing system in which a control method of a storage apparatus according to an embodiment of the present invention is implemented.

The embodiment is described by taking as an example the case where the present invention is applied to a magnetic disk apparatus having a magnetic disk as a storage medium as an example of the storage apparatus.

In FIG. 1, numeral 10 denotes a host computer, 20 a magnetic disk apparatus, 21 a magnetic disk controller having a magnetic disk combined therewith integrally for controlling the magnetic disk apparatus, 23 a magnetic disk, 22 a connection interface for connecting the magnetic disk controller and the magnetic disk, and 30 a connection interface conforming to the standard such as the SCSI for connecting the host computer and the magnetic disk apparatus.

In the case of FIG. 1, the host computer 10 can designate to the magnetic disk apparatus 20 a plurality of sets of area addresses and area sizes as parameters for dividing a storage area of the magnetic disk 23 into a plurality of storage areas and also can set the number of times of retrying operations, the prescribed time for reading and writing and the like for each storage area unit as parameters individually. An example that the number of division of the area of the magnetic disk 23 can be set to any value is described.

That is, upon start of the system, the host computer 10 issues a command to the magnetic disk apparatus 21 placed thereunder to designate the limit values of retrying operation such as an upper limit of the number of times of retrying operations and the time required for retrying operation in each of a plurality of storage areas A, B, . . . provided in the magnetic disk 23 constituting the storage medium and set the limit values in a retrying table 21a provided in the magnetic disk controller 21.

Information such as an area address 21b, an area size 21c (range) and a limit value for retrying 21d is stored in each of a plurality of entries corresponding to each of the plurality of storage areas A, B, . . . in the retrying table 21a in response to an instruction of the host computer 10.

A setting method from the host computer 10 of such a retrying table 21a is considered to be realized by designating a vender unique parameter 30-2 in a command descriptor block 30-1 exemplified in FIG. 3 when the connection interface 30 is the SCSI as an example.

That is, "0x15" is set in a field of an operation code 30-1a of the command descriptor block 30-1 to designate that this command is a command for designating a mode parameter and further a byte length of a subsequent vender unique mode parameter 30-2 is designated by a parameter list length 30-1b.

In the vender unique mode parameter 30-2, a value other than a reservation code prescribed by ANSI is used to display in a page code 30-2a that the parameter is the vender unique and subsequent data composed of a plurality of bytes are used to designate a retrying limit value 30-2d (the retrying limit value 21d of FIG. 1) such as an area start address 30-2b (the area address 21b of FIG. 1), a length 30-2c (the area size 21c of FIG. 1), a read retry count, a read time limit, a write retry count, a write time limit, a verify retry count and a verify time limit repeatedly by the number of a necessary-divided storage areas to be arranged.

As described above, in the magnetic disk controller 21 of the magnetic disk apparatus 20 in which the retrying limit value 21d is set in each of the plurality of storage areas of the magnetic disk 23, an address value annexed to a reading or writing request received from the host computer 10 is compared with the area address 21b to thereby interpret a storage area corresponding to the request and when an error is detected in actual reading or writing operation of the magnetic disk 23, the retrying operation is performed within the retrying limit value such as the number of times of retrying operations or the prescribed time corresponding to the access area.

Referring now to the flow chart of FIG. 5, the reading operation in case where the number of times N of retrying operations for limit is used as the retrying limit value 21d is described by way of example.

First, when start such as boot of an information processing system is performed (step 101), the host computer 10 performs device recognition for recognizing connection of the magnetic disk apparatus 20 placed thereunder (step 102). Then, the host computer 10 performs setting of mode parameters using the command descriptor block 30-1 and the vender unique mode parameter 30-2 as exemplified in FIG. 3 to the magnetic disk apparatus 20 as a part of an initialization sequence of the interface such as the SCSI, so that the retrying limit value 21d or the like is set in each of the plurality of storage areas A, B, . . . (step 103).

The magnetic disk controller 21 waits for a command (step 104) and when reception of a command is detected, it is judged whether the command is a reading command or not (step 105). When it is not the reading command, the processing corresponding to the command is performed (step 110). On the other hand, when the command is a reading command, data is read from the designated area of the magnetic disk 23 (step 106). When there is no reading error (step 107), the read data is transmitted to the host computer (step 108) and the same operation as above is repeated until the reading operation is completed (step 109).

When a reading error is detected in step 107, the number of times N of retrying operations for limit set for the area to be read is read from the retrying table 21a and after the number of times n of retrying operations has been initialized (step 111), it is judged whether the number of times n of retrying operations up to now exceeds the number of times N of retrying operations for limit or not (step 112). When the number of times n does not exceed the number of times N, the retrying operation of reading and increment of the number of times n of retrying operations are performed (step 113). Operations in steps 112 to 113 are performed until the retrying operation is successful (step 114). When the retrying operation is successful, the read data is transmitted to the host computer 10 (step 116).

In step 112, when the number of times n of retrying operations exceeds the number of times N of retrying operations for limit, it is judged whether the area is the management data area or not (step 117). When the area is the management data area, a retrying unrecoverable error is informed to the host computer 10 (step 118) and the process is returned to the command waiting state.

In step 117, when it is ascertained that the data is not the management data area, the retrying operation is not performed and, for example, dummy read data is transmitted to the host computer 10 as data for a block that cannot be recovered by the retrying operation or as data of the block from the data buffer in the magnetic disk controller 21 in which data read from the magnetic disk 23 is stored (step 115).

With the above control of the number of times of retrying operations, the numbers of times N of retrying operations for limit are set to be different values as the retrying limit value 21d depending on the storage area A of the magnetic disk 23 in which data such as management data requiring high reliability are stored and the storage area B in which data such as image data of which real-time property for reading operation is regarded as important are stored (in this case, N for the storage area A>N for the storage area B), so that retrying operation for reading of data such as the management data in the storage area A can be repeated by sufficient number of times to enhance the reliability of read data and retrying operation for reading of data such as image data in the storage area B can be repeated by smaller number of times to ensure the real-time property for reading processing without influence by the retrying operation to thereby realize the optimum retrying processing according to the characteristics required for data stored in the plurality of storage areas A, B, . . . .

Figure 6:
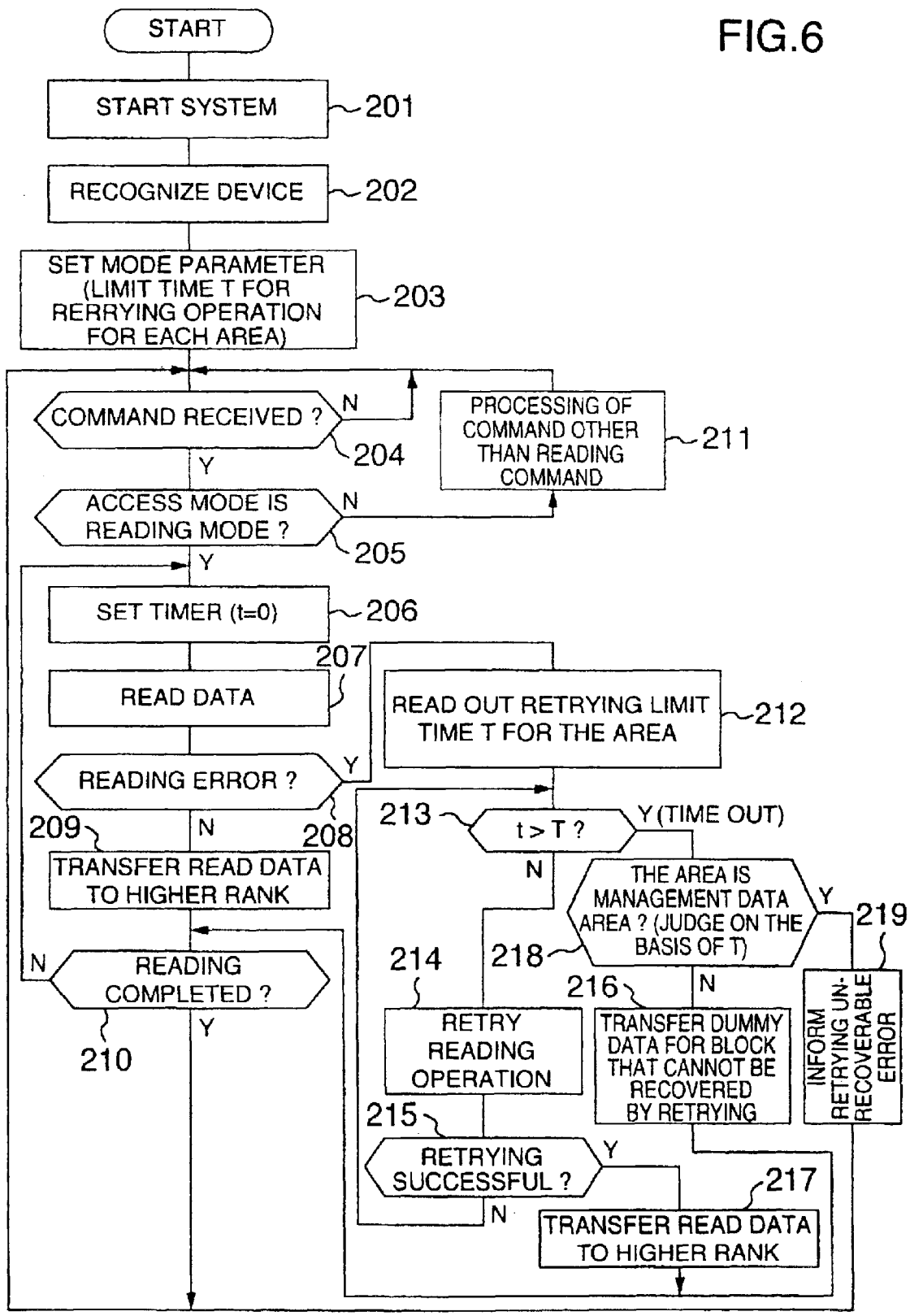
FIG. 6 is a flow chart showing an example of operation of a control method of a storage apparatus according to an embodiment of the present invention.
Figure 7:
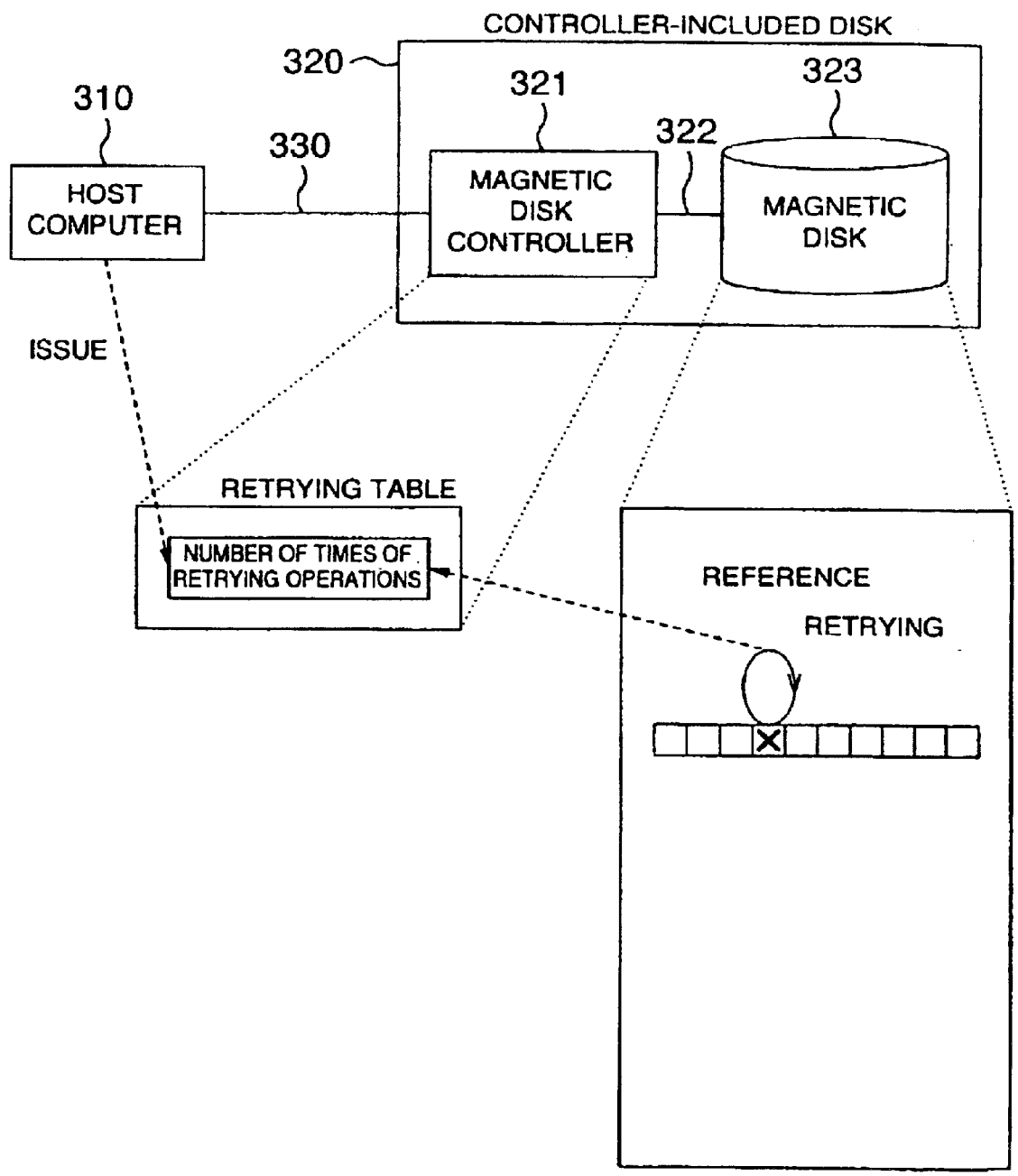
FIG. 7 is a schematic diagram illustrating retrying processing in a magnetic disk apparatus of a conventional reference technique.

Referring now to FIG. 6, the reading operation in case where the retrying limit time T is used as the retrying limit value 21d is described by way of example.

First, when start such as boot of an information processing system is performed (step 201), the host computer 10 performs device recognition for recognizing connection of the magnetic disk apparatus 20 placed thereunder (step 202). Then, the host computer 10 performs setting of mode parameters using the command descriptor block 30-1 and the vender unique mode parameter 30-2 as exemplified in FIG. 3 to the magnetic disk apparatus 20 as a part of an initialization sequence of the interface such as the SCSI, so that the retrying limit value 21d or the like is set in each of the plurality of storage areas A, B, . . . (step 203).

The magnetic disk controller 21 waits for a command (step 204) and when reception of a command is detected, it is judged whether the command is a reading command or not (step 205). When it is not the reading command, the processing corresponding to the command is performed (step 211). On the other hand, when the command is a reading command, a timer for managing the time t required for retrying operation is first initialized (step 206). Then, data is read from the designated area of the magnetic disk 23 (step 207) and when there is no reading error (step 208), the read data is transmitted to the host computer 10 (step 209) and the same operation as above is repeated until the reading operation is completed (step 210).

In step 208, when a reading error is detected, the retrying limit time T set for the area to be read is read out from the retrying table 21a (step 212) and then it is judged whether the time t required for retrying operation up to now exceeds the retrying limit time T or not (step 213). When the time t does not exceed the retrying limit time T, the retrying operation for reading is performed (step 214) and the steps 213 to 214 are performed repeatedly until the retrying operation is successful (step 215). When the retrying operation is successful, the read data is transmitted to the host computer 10 (step 217).

In step 213, when the time t required for retrying operation exceeds the retrying limit time T, it is judged whether the area is the management data area or not (step 218). When the area is the management data area, the retrying unrecoverable error is informed to the host computer 10 (step 219) and the process is returned to the command waiting state.

In step 218, when it is ascertained that the data is not the management data area, the retrying operation is not performed and, for example, dummy read data is transmitted to the host computer 10 as data of the block from the data buffer in the magnetic disk controller 21 in which data read from the magnetic disk 23 is stored (step 216).

In this case, by controlling the time t required for retrying operation as the retrying limit value 21d, the retrying limit values T are set to be different values as the retrying limit value 21d depending on the storage area A of the magnetic disk 23 in which data such as management data requiring high reliability are stored and the storage area B in which data such as image data of which real-time property for reading operation is regarded as important are stored (in this case, T for the storage area A>T for the storage area B), so that retrying operation for reading of data in the storage area A can be repeated in a sufficiently long time to enhance the reliability of read data and retrying operation for reading of data in the storage area B can be repeated in a shorter time to give preference to the real-time property for reading operation to thereby realize the optimum retrying processing according to the characteristics required for each of the plurality of storage areas A, B, . . . .

FIG. 2 is a schematic diagram illustrating an example of a configuration of the information processing system in which a modification example of the control method of the storage apparatus according to the present invention is implemented. In FIG. 2, the constituent elements similar to those of FIG. 1 are designated by the same reference numerals and description thereof is omitted.

In the above example, the case where information such as the retrying limit value 21d is set together from the host computer 10 to the magnetic disk apparatus 20 upon start or the like of the system has been described, while the present invention is not limited thereto and as shown in FIG. 2, the retrying limit value 21d may be given to an individual command unit given to the magnetic disk apparatus 20 from the host computer 10 as one of parameters for the command.

In other words, when the connection interface 30 is the SCSI or the like, a part of the reservation area of the command descriptor block 30-3, for example as shown in FIG. 4, for reading and writing commands transmitted through the connection interface 20 can be used as a storage field of the retrying limit value 30-4 (retrying limit value 21d of FIG. 1) such as the retry count or command time limit to transfer the retrying limit value, so that the retrying limit value 21d can be set in the retrying table 21a of the magnetic disk controller 21 each time.

Thus, the magnetic disk apparatus 20 which has received the command such as the reading or writing instruction from the host computer 10 can perform the retrying operation by the number of times of retrying operations or within the prescribed time designated by the reading or writing instruction when an error is detected.

As described above, by adopting the system in which the retrying limit value 21d is designated in each command, the optimum number of times of retrying operations can be set or the execution time for the reading and writing operation can be controlled to be completed within the prescribed time in each data unit (data set unit for a file) in which the reading and writing operation is performed without management using the plurality of divided storage areas of the magnetic disk 23.

As described above, according to the control method of the storage apparatus of the embodiment, the number of times of retrying operations or the retrying limit value for time can be designated for each area in the magnetic disk 23 of the magnetic disk apparatus 20 placed under the host computer 10 or for each access instruction in the connection interface 30 between the host computer 10 and the magnetic disk apparatus 20, so that data having different properties to be preferred such as the reliability and the real time property of processing can be stored in the single magnetic disk 23 to thereby realize the various and optimum retrying processing in accordance with each of the properties. Thus, for example, the real time property of the access processing by the high-speed reading and writing of the audio or image data can be ensured while the reliability of the management data is ensured.

As described above, the invention which has been made by the inventor has been described definitely on the basis of the embodiment, although it is needless to say that various changes and modifications may be made in the invention without departing from the gist thereof.

For example, the storage apparatus is not limited to the magnetic disk apparatus and the storage apparatus provided with any storage medium such as an optical disk, a magnet-optical disk and a semiconductor memory can be widely used.

According to the control method of the storage apparatus of the present invention, there can be obtained the effect that the retrying condition for the access operation to each of the plurality of storage areas set in the storage medium or to each of the plurality of kinds of data stored in the storage medium can be set variously to thereby realize the optimization of the retrying for the access operation.

Further, there can be obtained the effect that the reading and writing command can be completed within the prescribed time required for the data such as the image data and the audio data of which the processing in real time is important and the retrying operation can be performed as much as possible to make reading and writing without deterioration of the reliability for the data such as the management data of which the reliability is important.

What is claimed is:

1. A control method of a storage apparatus including a storage medium in which data transmitted to and received from a higher-rank apparatus are stored comprising the steps of:

setting, for each of a plurality of access commands for reading or writing data from or to said storage apparatus, a number of times of retrying operations as a parameter of said access command; and forwarding said access command from said higher-rank apparatus to said storage apparatus;

wherein said access command includes a first storage field in which an operation code for instructing said access command is set and a second storage field in which said number of times of retrying operations is set; and wherein said data are management data, image data or audio data and said number of times of retrying operations for said image data or said audio data is made smaller than said number of times of retrying operations for said management data.

2. The control method of a storage apparatus according to claim 1 comprising the steps of:

setting said number of times of retrying operations, which is set in the second storage field in said access command forwarded from said higher-rank apparatus to said storage apparatus, in a retrying table provided in said storage apparatus; and executing a retrying operation as instructed by said operation code set in said first storage field, with said number of times of retrying operations set in said retrying table as an upper limit.

3. The control method of a storage apparatus according to claim 1 comprising the step of:

designating said operation code and said number of times of retrying operations in a command descriptor block of said access command, in case that a connection interface between said higher-rank apparatus and said storage apparatus is SCSI, wherein said command descriptor block includes said first storage field and said second storage field.

4. A storage apparatus comprising:

a storage medium in which data transmitted to and received from a higher-rank apparatus are stored;

control apparatus connected to said higher-rank apparatus and executing access operation of reading or writing data from or to said storage medium in response to an access command issued from said higher-rank apparatus;

wherein said control apparatus includes a retrying table, and sets a number of times of retrying operations in said retrying table responding to said access command; and wherein said data are management data, image data or audio data and said number of times of retrying operations for said image data or said audio data is made smaller than said number of times of retrying operations for said management data.

5. The storage apparatus according to claim 4, wherein a connection interface between said higher-rank apparatus and said storage apparatus is SCSI, said control apparatus receives a command descriptor block in which a parameter of said access command is set whenever said control apparatus receives an access command from said higher-rank apparatus via said connection interface, said command descriptor block includes said first storage field for storing an operation code for instructing said access command and said second storage field for storing said number of times of retrying operations, and said control apparatus sets in said retrying table said number of times of retrying operations from said second storage field of said command descriptor block.

* * * * *